(12) United States Patent
Freydank et al.

(10) Patent No.: US 7,906,737 B2
(45) Date of Patent: *Mar. 15, 2011

(54) ELECTRONIC SCALE COMPRISING AN INCLINOMETER AND CORRESPONDING SIGNAL EVALUATION METHOD

(75) Inventors: Gerd Freydank, Goettingen (DE); Winfried Graf, Niemetal (DE); Christian Oldendorf, Goettingen (DE)

(73) Assignee: Sartorius AG, Goettingen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/483,572

(22) Filed: Jun. 12, 2009

(65) Prior Publication Data
US 2009/0242279 A1 Oct. 1, 2009

Related U.S. Application Data

(63) Continuation of application No. PCT/EP2007/009619, filed on Nov. 7, 2007.

(30) Foreign Application Priority Data

Dec. 15, 2006 (DE) .......................... 10 2006 059 261

(51) Int. Cl.
*G01G 23/01* (2006.01)
*G01G 7/00* (2006.01)
(52) U.S. Cl. .............. 177/25.13; 177/210 EM; 177/212; 33/366.16; 73/653; 73/655
(58) Field of Classification Search ............... 177/25.13, 177/185, 210 EM, 212; 33/366.16; 73/653, 73/655
See application file for complete search history.

(56) References Cited

U.S. PATENT DOCUMENTS

| | | | |
|---|---|---|---|
| 3,234,372 A | | 2/1966 | Kuttner |
| 3,322,222 A | | 5/1967 | Baur |
| 4,102,421 A | * | 7/1978 | Ozaki et al. .................. 177/185 |
| 4,258,811 A | | 3/1981 | Franzon et al. |
| 4,466,500 A | * | 8/1984 | Mosher et al. .................... 177/1 |
| 4,494,620 A | * | 1/1985 | Knothe et al. ............. 177/25.13 |
| 4,529,050 A | * | 7/1985 | Mosher et al. .................... 177/1 |
| 4,550,792 A | * | 11/1985 | Mosher et al. ............ 177/25.18 |
| 4,802,541 A | * | 2/1989 | Bator et al. .................... 177/212 |
| 5,161,628 A | * | 11/1992 | Wirth ............................ 177/137 |
| 5,172,781 A | * | 12/1992 | Hlavinka et al. .............. 177/144 |
| 5,178,227 A | | 1/1993 | Kvisgaard et al. |

(Continued)

FOREIGN PATENT DOCUMENTS

WO 90 05285 A 5/1990

*Primary Examiner* — Randy W Gibson
(74) *Attorney, Agent, or Firm* — Sughrue Mion, PLLC

(57) ABSTRACT

An electronic scale having a measuring sensor (1 . . . 16), a digital signal processing unit (18), a digital display (19) and an inclinometer (40). The inclinometer derives a signal for the tilt of the scale from the difference of at least two signals. The digital signal processing unit (18) is provided with an additional circuit component or program routine that adds the two signals and, by way of this cumulative signal, corrects the vibration-distorted signal of the measuring sensor (1 . . . 16). A plurality of inclinometers enables the simultaneous detection of momentary gravitational acceleration. For example, in an electric bubble level, the gas bubble moves out of place when tilted and the diameter of the gas bubble changes when the gravitational acceleration changes. The scale thus provides an additional signal for correcting the influence of disturbances with minimum complexity.

14 Claims, 6 Drawing Sheets

U.S. PATENT DOCUMENTS

| | | | |
|---|---|---|---|
| 5,653,417 A * | 8/1997 | DeBarber et al. | 248/688 |
| 5,717,167 A * | 2/1998 | Filing et al. | 177/136 |
| 5,959,257 A * | 9/1999 | Campbell et al. | 177/16 |
| 6,236,001 B1 * | 5/2001 | Shymko | 177/149 |
| 6,794,586 B1 * | 9/2004 | Mason | 177/25.15 |
| 6,987,227 B2 * | 1/2006 | Wakasa | 177/25.13 |
| 7,325,321 B2 * | 2/2008 | Kunzi et al. | 33/366.16 |
| 2007/0007046 A1 * | 1/2007 | Reber | 177/25.13 |
| 2009/0301790 A1 * | 12/2009 | Freydank et al. | 177/25.13 |

* cited by examiner ary acceleration. With the scale tilted, a difference signal which is dependent on the tilted position is produced, in a known manner. From the sum of the signals from the two accelerometers, a signal is produced which is proportional to the gravitational acceleration.

ELECTRONIC SCALE COMPRISING AN INCLINOMETER AND CORRESPONDING SIGNAL EVALUATION METHOD

This is a Continuation of International Application PCT/EP2007/009619, with an international filing date of Nov. 7, 2007, which was published under PCT Article 21(2) in German, and the complete disclosure of which, including amendments, is incorporated into this application by reference.

FIELD AND BACKGROUND OF THE INVENTION

The invention relates to an electronic scale comprising a measuring sensor, a digital signal processing unit, a digital display and an inclinometer, said inclinometer deriving a signal for the tilt of the scale from the difference of at least two signals.

Scales of this type are generally known and are described, for example, in DE 32 34 372C2 (which corresponds to U.S. Pat. No. 4,494,620). The electrical signal from the inclinometer is used, employing digital means, to correct the error in the scale caused by the cosine effect when it is tilted. This means that the scale no longer has to be placed in an exactly horizontal orientation through the use of adjusting feet.

However, these scales have not become established in practice, since the cost of the inclinometer has been considered too great in relation to the benefit therefrom.

OBJECTS AND SUMMARY OF THE INVENTION

An object of the invention is therefore to develop a scale of the aforementioned type such that the inclinometer brings an additional benefit for the signal processing of the scale.

This is achieved according to one formulation of the invention in that the digital signal processing unit is provided with an additional circuit component or program routine which adds the two signals together and corrects the signal of the measuring sensor which is distorted by vibrations.

Many of the aforementioned types of inclinometers are able to measure vertical acceleration (due to gravity) as well as tilt. If, for example, a bubble level is used as the inclinometer wherein the position of the gas bubble is read out optically or electrically, then a tilt of the scale leads, in a known manner, to a displacement of the gas bubble and thus to a difference signal to the optical receivers or the electrodes of the bubble level. In addition, the gas bubble changes its diameter as a function of the gravitational acceleration acting upon it. Where the gravitational acceleration is high, the gas bubble becomes thin and has a larger diameter, whereas where the gravitational acceleration is low, the gas bubble becomes more spherical due to the surface tension in the liquid and its diameter becomes smaller. If the gravitational acceleration changes—in the event, for example, of vertical vibrations—the diameter of the gas bubble changes synchronously therewith. From the change in the diameter signal, conclusions can be drawn concerning the size and phase position of the vibrations. The diameter signal is produced by the sum of the signals from the optical receivers and/or from the electrodes of the bubble level. As a result, from the signal for the displacement (the difference signal), the digital signal processing unit can carry out the known correction of the tilting influences on the weighing result, while simultaneously performing a correction of the vibration influences based on the diameter signal (the cumulative signal).

Another type of inclinometer comprises, for example, two accelerometers inclined at approximately 45° to the horizontal. With the scale oriented horizontally, the signals from the two accelerometers are equal, so that the difference is zero. With the scale tilted, a difference signal which is dependent on the tilted position is produced, in a known manner. From the sum of the signals from the two accelerometers, a signal is produced which is proportional to the gravitational acceleration.

An inclinometer which is made from a flexibly suspended pendulum, wherein the lateral displacement is measured using strain gauges, can also be used in a corresponding manner. The difference signal from the two strain gauges on the pendulum suspension provides the tilt signal and the cumulative signal is proportional to the momentary gravitational acceleration.

BRIEF DESCRIPTION OF THE DRAWINGS

Further features and advantages will now be described with reference to the schematic drawings, in which.

DETAILED DESCRIPTION OF THE PREFERRED EMBODIMENTS

Figure 1:
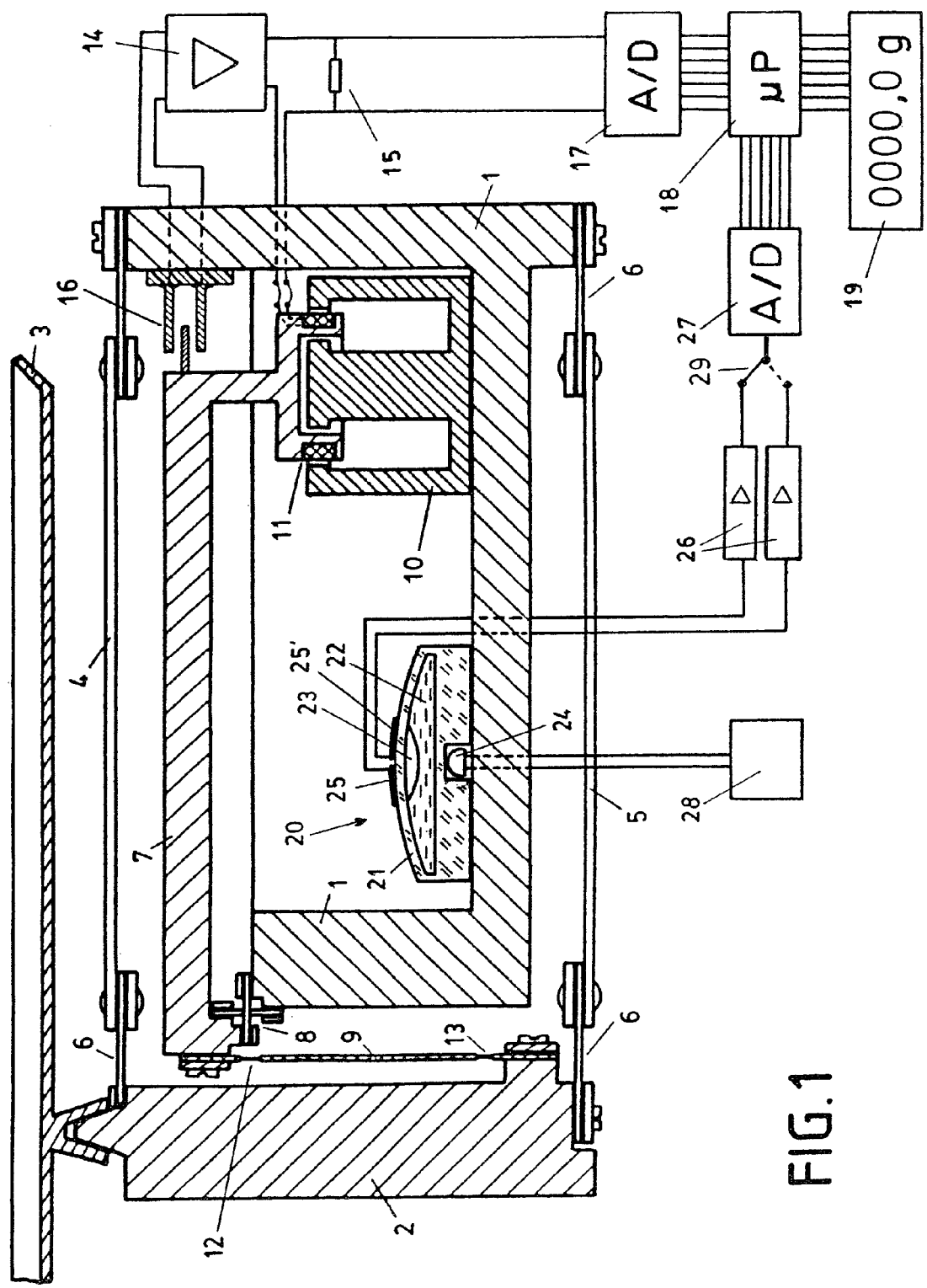
FIG. 1 is a sectional representation of the primary parts of a scale with a bubble level and provided with optical positional detection as the inclinometer.

The electronic scale of FIG. 1 includes a support member 1 fastened to a housing. A load carrier 2 is connected via two rods 4 and 5 to the articulation points 6 such that the load carrier 2 is movable in the vertical direction. The load carrier carries, in its upper part, a load pan 3 for receiving the goods being weighed and transfers the force corresponding to the mass of the goods being weighed via a coupling element 9, which has narrowed sites 12 and 13, to the shorter lever arm of a transmission lever 7. The transmission lever 7 is mounted on the support member 1 by means of a flexural pivot 8. The compensation force, which is generated by a coil 11 through which a current flows and which is arranged in the air gap of a permanent magnet system 10, engages on the longer lever arm of the transmission lever 7. The size of the compensation current is controlled in a known manner by means of a position sensor 16 and a control amplifier 14 such that a balance is struck between the weight of the goods being weighed and the electromagnetic compensation force. The compensation current generates a measurement voltage across a measuring resistor 15 and the voltage is fed to an analog/digital converter 17. The digitized result is passed to a digital signal processing unit 18 and displayed in digital form on the digital display 19.

Scales of this type are generally known in their design and function, for which reason they have been described only generally and concisely above.

An electric bubble level is also built into the scale as the inclinometer 20. The bubble level includes a transparent container 21 which is partially filled with a liquid 22, so that a gas bubble 23 is formed at the highest site of the container 21. Due to the curvature of the upper limiting surface of the container 21, the position of this gas bubble 23 depends on the tilt of the scale. In the drawings, this curvature is shown exaggerated for the sake of clarity. Arranged centrally beneath the container 21 is a light-emitting diode (LED) 24 which emits its radiation vertically upwardly through the lower container wall, the liquid 22, the gas bubble 23 and the upper container wall. The radiation which is not absorbed is then registered by two light-sensitive elements—for example, two photodiodes—25 and 25'. The liquid 22 is selected and/or colored so that it partially absorbs the radiation from the LED. The result is that the intensity of light falling on the light-sensitive elements 25 and 25' is strongly dependent on the thickness of liquid through which it passes, and therefore on the position of the gas bubble 23. The LED 24 is supplied with a constant current by a current supply unit 28. The output signal from the light-sensitive elements 25 and 25' is amplified in two amplifiers 26 and fed via a multiplexer 29 to an analog/digital converter 27 and digitized therein. The digital signal processing unit 18 can then calculate the tilt of the scale from the difference of the signals and the known characteristic curve of the bubble level, and accordingly correct the measured value of the scale system, which is supplied by the analog/digital converter 17.

Figure 2:
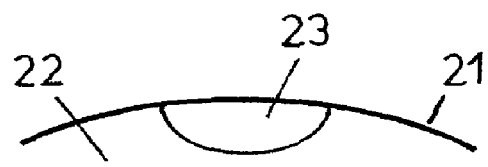
FIG. 2 shows the form of the gas bubble of the inclinometer of FIG. 1 given a small gravitational acceleration.
Figure 3:
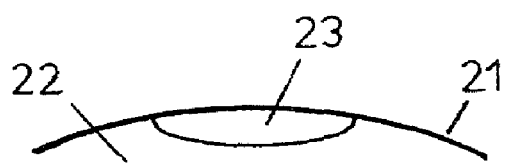
FIG. 3 shows the form of the gas bubble of the inclinometer of FIG. 1 given a large gravitational acceleration.

The influence of gravitational acceleration on the form of the gas bubble is shown in FIGS. 2 and 3. When the gravitational acceleration is small, the influence of surface tension is predominant and the form of the gas bubble approaches that of a sphere, as shown in FIG. 2. At higher gravitational acceleration levels, the influence of the gravitational acceleration is greater and the gas bubble is pressed into a flatter form, as shown in FIG. 3. When the scale is subjected to vertical vibration, larger and smaller gravitational accelerations are produced alternatingly and in sync with the vibration. As a result, the diameter of the gas bubble also varies synchronously with the vibration. The digital signal processing unit 18 can calculate the diameter from the cumulative signal from the two light-sensitive elements 25 and 25'. A pre-condition for this is, naturally, that the multiplexer 29 and the analog/digital converter 27 are fast enough so that they correctly reproduce the size and phase angle of the vibrations. Since the main vibrations lie within the frequency range of approximately 0.1 Hz to 10 Hz, this does not pose a problem. Vibrations having a higher frequency, for example over 50 Hz, can be effectively suppressed with common digital filters, so that there is no necessity for additional suppression of disturbance signals in this frequency region.

Figure 4:
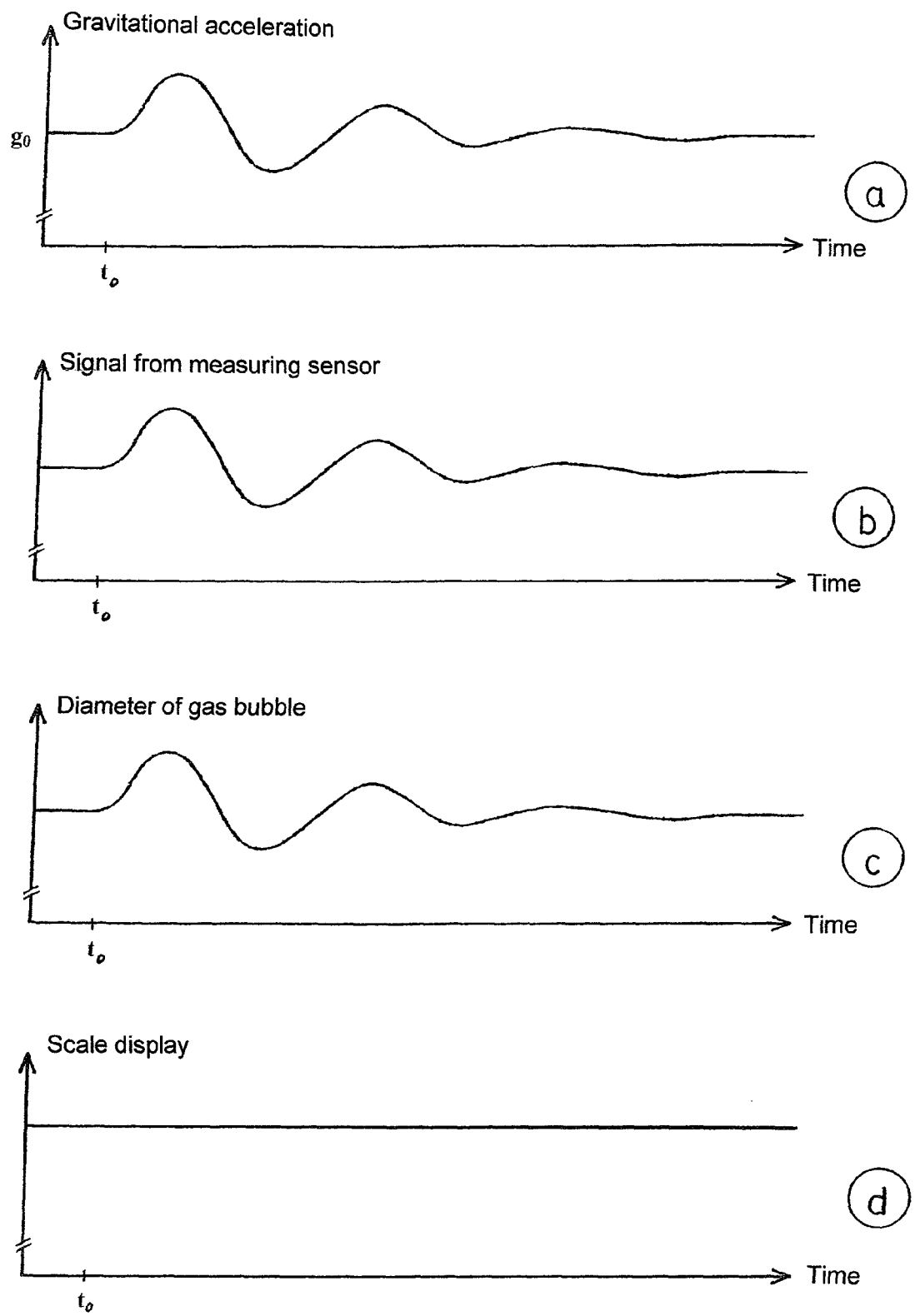
FIG. 4 is a graphical representation of the correction of disturbances.

FIG. 4 shows, by way of example, the correction of a disturbance occurring at the time point $t_0$. Graph a shows the disturbance which acts externally on the scale. Normal gravitational acceleration $g_0$ is shown overlaid, from time point $t_0$, with a disturbance acceleration, which begins with an increased gravitational acceleration and which, after a few periods, dies away relatively rapidly. This disturbance acts proportionally on the signal of the measuring sensor, as can be detected, for example, from the measuring resistor 15 and as shown in graph b. The disturbance acceleration acts in a similar manner on the diameter of the gas bubble, as shown in graph c. The digital signal processing unit 18 then corrects the signal from the measuring sensor with suitable correction algorithms, so that the disturbance in the digital display 19 has no, or only a greatly reduced, effect (graph d).

These correction algorithms can be readily designed by a person skilled in the art, taking account, for example, of the fact that with a larger weight on the load pan 3, a greater correction is necessary.

It has been assumed in the foregoing that the current cumulative signal from the bubble level is used directly for correction of the current signal from the measuring sensor. Naturally, this is based on the pre-condition that the frequency and phase behavior of the diameter signal agrees in the frequency range of the correction with the frequency and phase behavior of the measuring sensor. This agreement can be achieved, for example, through appropriate selection of the viscosity of the liquid 22 in the bubble level, as well as through analog or digital filtration of the diameter signal. In the same way, the signal from the measuring sensor can be filtered in a known manner before the vibration correction is carried out as described.

Alternatively, however, simpler correction strategies are also possible. For example, the digital signal processing unit 18 can easily determine the mean amplitude of the changes in the cumulative signal, and thereby also the mean amplitude of the disturbance acceleration. Based on the resulting signal, at least one filter stage in the filtration of the signal from the measuring sensor can be adjusted. Where the disturbance accelerations are small, the signal from the measuring sensor is filtered only slightly, whereas for large disturbance accelerations, the filter time constant is increased and a stable display output is achieved despite the worsened recording conditions.

In another advantageous embodiment, only the frequency of the change in the cumulative signal is determined. It is then ensured by, for example, altering the sampling frequency of the analog/digital converter 17, that the sampling frequency is a multiple of the disturbance frequency, in order thus to suppress this disturbance frequency particularly effectively. The same is also possible by suitable adjustment of the digital filtration in the digital signal processing unit 18. This alternative is particularly advantageous when the disturbance accelerations are not of a short-term nature—as assumed in FIG. 4—but act on the scale for a longer period. An example of this is the oscillations of a building due to poorly balanced rotating machinery.

The variants of the vibration correction described so far are all based on correction in the digital signal processing unit 18 of the signal from the measuring sensor. However, it is also possible to provide actuators, for example in the feet of the scale, such that the actuators mechanically correct any tilt and any vibrations measured by the bubble level. For a tilted position of the scale, this procedure is known and is realized, for example, with motor-powered adjusting feet. In similar manner, this can be realized for the disturbance accelerations with actuators that enable adjustment in the required frequency range. For example, piezo actuators are suitable for this purpose. These actuators are then controlled, for example, in a feedback control circuit such that the vibration signal from the bubble level is regulated to (almost) zero.

In order to evaluate the signals from the inclinometer of FIG. 1, it has been described to digitize the signals from the light-sensitive elements 25 and 25' in an analog/digital converter 27. However, circuits are also possible which make available the difference signal and the cumulative signal by analog electrical circuitry. A circuit of this type is shown by way of example in FIG. 5. The two light-sensitive elements 25 and 25' are connected, together with the two equal-value resistors 35 and 35', to a first Wheatstone bridge. The difference signal can then be tapped off at the output of the bridge amplifier 37. The whole of the first bridge forms, together with the three further bridge resistors 32, 33 and 34, a second Wheatstone bridge from the diagonals of which the cumulative signal can be tapped off via the bridge amplifier 36. The supply voltage for the Wheatstone bridges is applied to the terminal 38. If the signals from the light-sensitive elements 25 and 25' change in opposite directions, the balance of the second Wheatstone bridge is not altered, so that it is not influenced by the difference signal of the light-sensitive elements 25 and 25'. In a corresponding manner, a change in the same direction in the signals from the light-sensitive elements 25 and 25' has no influence on the output signal of the bridge amplifier 37. The outputs of the bridge amplifiers 36 and 37 thus only provide the cumulative signal or the difference signal, respectively.

Figure 6:
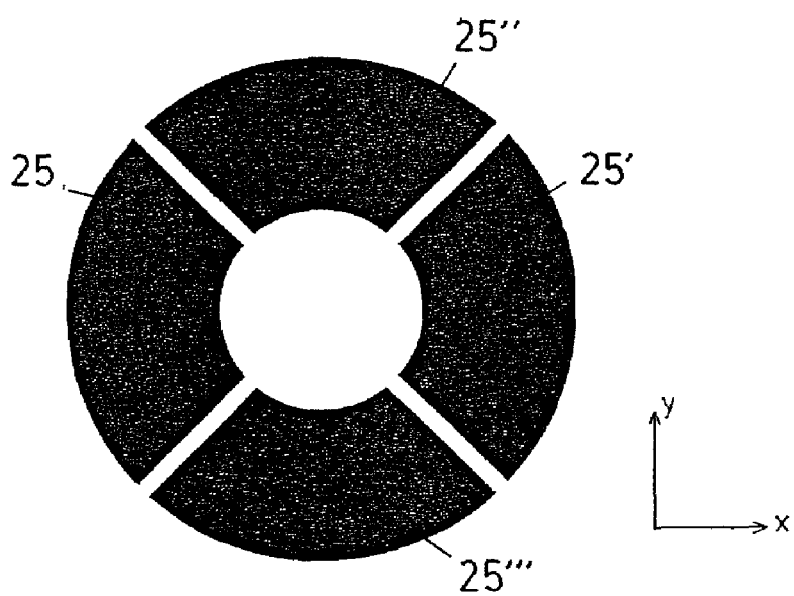
FIG. 6 is the arrangement of the light-sensitive elements of the inclinometer of FIG. 1.

In the above description, for reasons of clarity, sampling of the tilt of the scale has been shown and described in only one direction. For sampling in both directions, four light-sensitive elements 25, 25', 25'', 25''' are provided in the inclinometer 20, their form and arrangement being shown in FIG. 6. The difference signal from the light-sensitive elements 25 and 25' gives the tilt in the X-direction, while the difference signal from the light-sensitive elements 25'' and 25''' gives the corresponding tilt in the Y-direction. A respective amplifier is connected downstream of each of the light-sensitive elements 25'' and 25''' and the multiplexer 29 in FIG. 1 has two additional inputs (not shown). This geometry with four light-sensitive elements 25 . . . 25''' is the simplest for calculation and explanation, since the displacement in the X- and Y-directions is obtained directly from the differences in the signals of the opposing light-sensitive elements. It is also possible, however, with a slightly greater mathematical complexity, to determine the displacement in the X- and Y-directions using a higher number of elements, for example from three light-sensitive elements which, for example, are arranged at the corners of an equilateral triangle. The signal for the vertical gravitational acceleration is derived, in all cases, from the sum of the signals from the individual electrodes.

Figure 7:
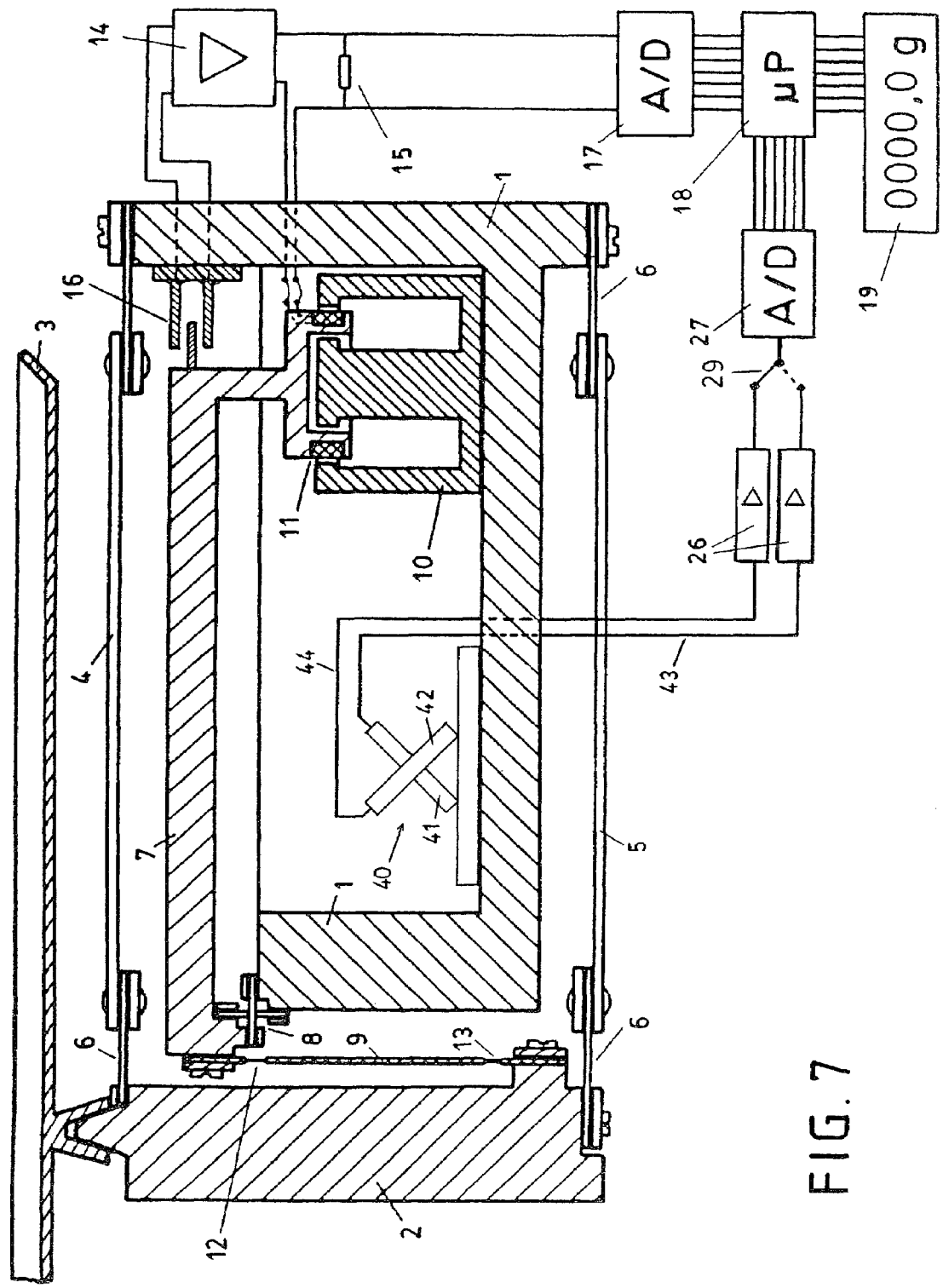
FIG. 7 is a sectional representation of the essential parts of a scale with two acceleration sensors as the inclinometer.

FIG. 7 shows a second embodiment of the scale, in which the inclinometer 40 is embodied as an arrangement with two accelerometers 41 and 42, which are built into the scale inclined at 45° to the horizontal. The accelerometers are shown only schematically in FIG. 7. These may be fashioned as micromechanically manufactured components, such as those known from automobile construction, as accelerometers/crash sensors. The voltage supply to the accelerometers 41 and 42 is not shown in FIG. 7, for reasons of clarity. The output signals from the accelerometers 41 and 42 are conducted via the signal lines 43 and 44 to amplifiers 26 and then digitized by the analog/digital converter 27. From the difference between the two signals, the tilt of the scale can be determined in a known manner and, from the sum of the two signals, the size of the gravitational acceleration/vibrations can be derived, as described above. The parts of the scale that have not been described are identical or analogous and are identified similarly to the corresponding parts of the scale of FIG. 1.

Figure 8:
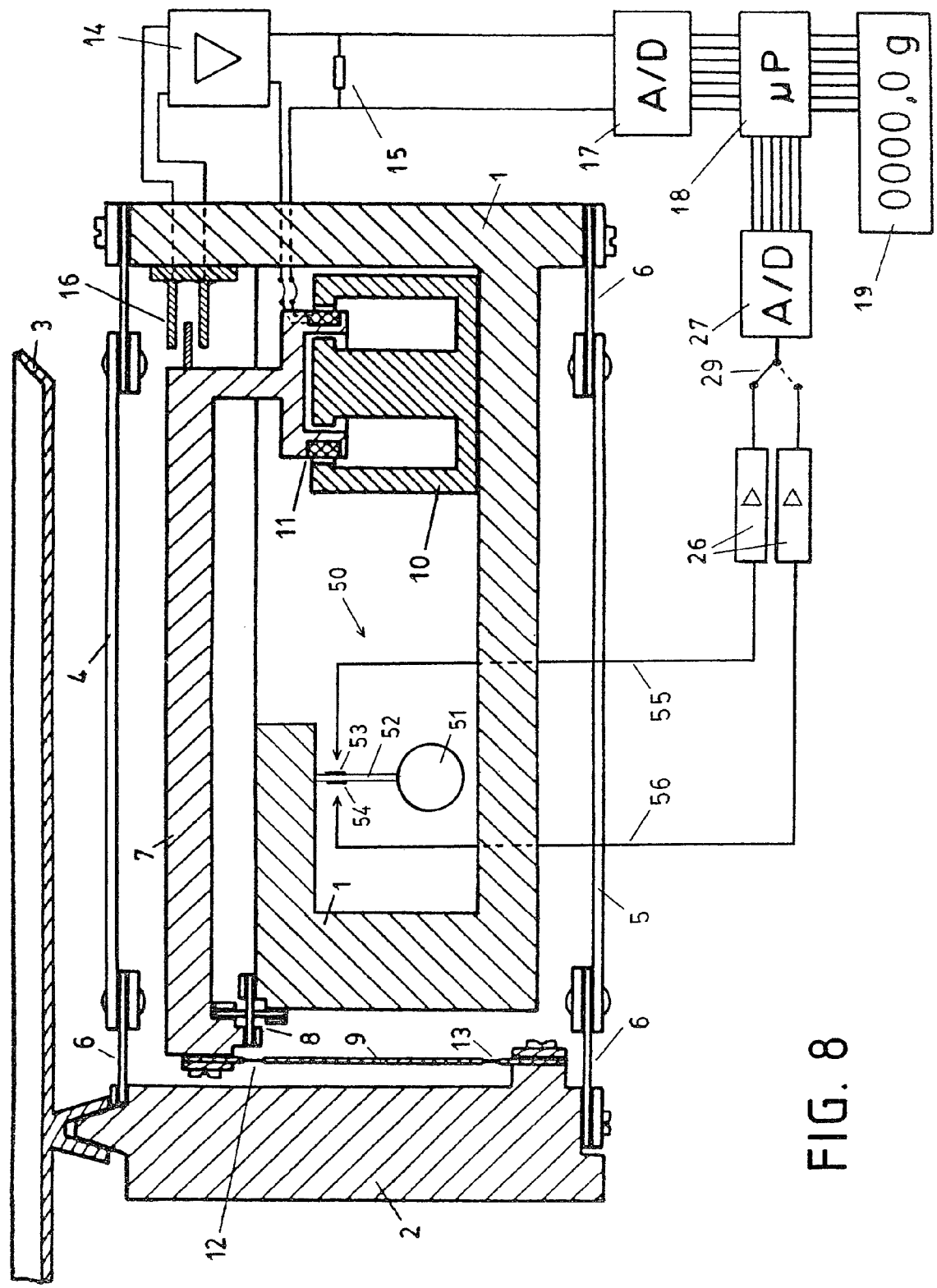
FIG. 8 is a sectional representation of the essential parts of a scale with a pendulum as the inclinometer.

FIG. 8 shows a third embodiment of the scale. In this embodiment, a pendulum 51 is built into the scale as the inclinometer 50, wherein the pendulum 51 is suspended via a flexible element 52 from the system support 1 of the scale. Two strain gauges 53 and 54 are applied to the flexible element 52, the signal from the strain gauges being fed via the (only schematically indicated) lines 55 and 56 to the amplifiers 26 and the analog/digital converter 27. If the scale is tilted, the two strain gauges 53 and 54 are differently stretched or compressed, so that a difference signal is produced. The two strain gauges 53 and 54 are stretched in the same direction due to the weight of the pendulum 51, wherein the amount of stretching is proportional to the gravitational acceleration. The cumulative signal from the two strain gauges is therefore proportional to the prevailing gravitational acceleration. The remaining parts of the scale of FIG. 8 are identical or analogous to the similarly identified parts of the scale of FIG. 1.

Figure 5:
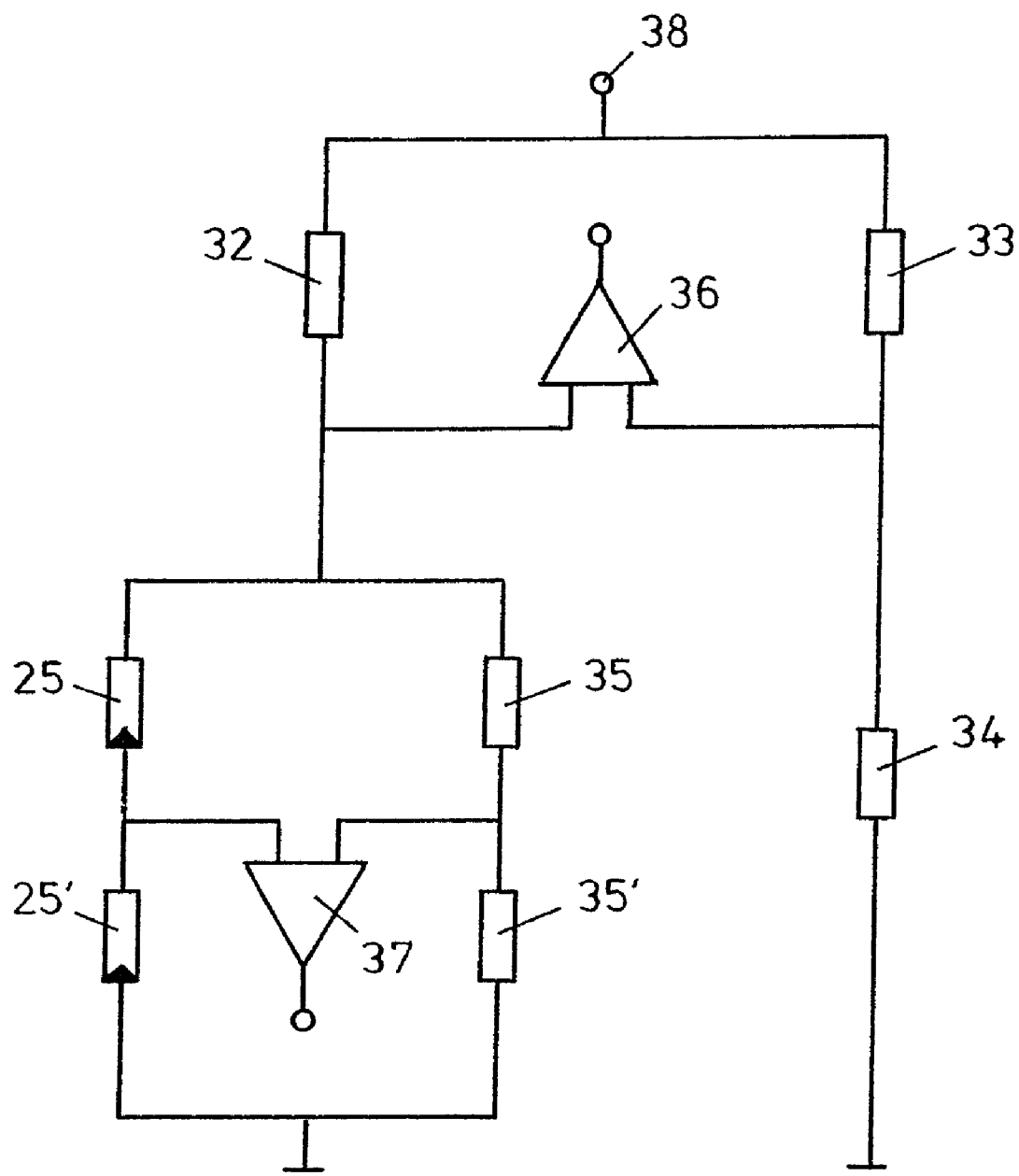
FIG. 5 is a possible circuit for analog measurement of the displacement and the diameter of the gas bubble.

The difference and cumulative signals from the strain gauges 53 and 54 can also be evaluated electrically in an analog manner, as described with respect to FIG. 5.

In the scales of FIGS. 7 and 8, the inclinometer 40 or 50 was described only on the basis of the tilt measurement in one direction, but extending it to both directions can easily be carried out by a person skilled in the art.

In the foregoing, it is only the correction of vibration influences that has been considered, with the emphasis in the 1 Hz region. This is the case of practical importance. However, it is also important to use the cumulative signal, which is proportional to the gravitational acceleration, in order to correct static and semi-static changes in the gravitational acceleration. This assumes the pre-condition, however, that the temporal stability of the inclinometer and its stability under changes of temperature are at least as good as the stability of the actual measuring sensor.

The above description of the preferred embodiments has been given by way of example. From the disclosure given, those skilled in the art will not only understand the present invention and its attendant advantages, but will also find apparent various changes and modifications to the structures and methods disclosed. The applicant seeks, therefore, to cover all such changes and modifications as fall within the spirit and scope of the invention, as defined by the appended claims, and equivalents thereof.

What is claimed is:

1. An electronic scale comprising:
   a measuring sensor outputting a signal distorted by vibrations,
   a digital signal processing unit,
   a digital display, and
   an inclinometer deriving a signal for a tilt of the scale from a difference of at least two signals,
   wherein the digital signal processing unit comprises at least one of a circuit component and a program routine configured to output a cumulative signal from the two signals, and
   wherein the digital signal processing unit corrects the distorted signal in accordance with the cumulative signal.

2. The electronic scale as claimed in claim 1, wherein the inclinometer comprises a bubble level with at least one of an optical detector and an electrical detector configured to detect a displacement of the gas bubble and a diameter of the gas bubble.

3. The electronic scale as claimed in claim 1, wherein the inclinometer comprises at least two accelerometers arranged inclined at an angle of at least approximately 45° to the horizontal.

4. The electronic scale as claimed in claim 1, wherein the inclinometer comprises a flexibly suspended pendulum and a detector measuring a lateral displacement of the pendulum.

5. The electronic scale as claimed in claim 1, further comprising an analog/digital converter interposed between the inclinometer and the digital signal processing unit, and wherein the digital signal processing unit digitally forms a difference value and a cumulative value from the at least two signals.

6. A method for evaluating the at least two signals from the inclinometer in an electronic scale according to claim 1, comprising calculating both a difference signal and the cumulative signal of the at least two signals from the inclinometer in the digital signal processing unit.

7. The method as claimed in claim 6, further comprising correcting the signal from the measuring sensor in accordance with the cumulative signal, to correct the influence of vibrations.

8. The method as claimed in claim 7, wherein the signal from the measuring sensor is a real-time signal and the digital signal processing unit utilizes real-time values of the cumulative signal to correct the real-time signal from the measuring sensor.

9. The method as claimed in claim 7, further comprising controlling actuators arranged on feet of the electronic scale in accordance with the cumulative signal.

10. The method as claimed in claim 7, further comprising adjusting a time constant of at least one filter provided in the digital signal processing unit in accordance with an amplitude of variations in the cumulative signal.

11. The method as claimed in claim 7, further comprising adjusting a sampling frequency of an analog/digital converter connected downstream of the measuring sensor in accordance with a frequency of variations in the cumulative signal.

12. An electronic scale comprising:
 a measuring sensor configured to output a weight signal corresponding to a weight of a material,
 an inclinometer configured to output at least two separate and contemporaneous signals,
 a processing unit configured to (i) provide a difference signal from the two signals and corresponding to a tilt of the scale, (ii) provide a cumulative signal from the two signals and corresponding to vibration influence on the scale, and (iii) adjust the weight signal with at least one of the difference signal and the cumulative signal.

13. The electronic scale according to claim 12, wherein the processing unit comprises an analog circuit.

14. The electronic scale according to claim 12, wherein the processing unit comprises digital programming routines.

* * * * *